United States Patent
Demmer et al.

(10) Patent No.: US 11,190,259 B2
(45) Date of Patent: Nov. 30, 2021

(54) DETECTION METHOD FOR LATTICE REDUCTION-AIDED MIMO SYSTEM RECEIVER AND ITERATIVE NOISE CANCELLATION

(71) Applicant: COMMISSARIAT A L'ENERGIE ATOMIQUE ET AUX ENERGIES ALTERNATIVES, Paris (FR)

(72) Inventors: David Demmer, Grenoble (FR); Jean-Baptiste Dore, Grenoble (FR)

(73) Assignee: COMMISSARIAT A L'ENERGIE ATOMIQUE ET AUX ENERGIES ALTERNATIVES, Paris (FR)

(*) Notice: Subject to any disclaimer, the term of this patent is extended or adjusted under 35 U.S.C. 154(b) by 29 days.

(21) Appl. No.: 16/781,000

(22) Filed: Feb. 4, 2020

(65) Prior Publication Data
US 2020/0259544 A1 Aug. 13, 2020

(30) Foreign Application Priority Data
Feb. 12, 2019 (FR) ..................................... 19 01358

(51) Int. Cl.
*H04B 7/06* (2006.01)
*H04B 7/0413* (2017.01)
(Continued)

(52) U.S. Cl.
CPC ......... *H04B 7/0634* (2013.01); *H04B 7/0413* (2013.01); *H04L 27/2688* (2013.01); *H04L 27/3483* (2013.01)

(58) Field of Classification Search
CPC .. H04B 7/0634; H04B 7/0413; H04B 7/0854; H04B 7/0456; H04L 27/2688;
(Continued)

(56) References Cited

U.S. PATENT DOCUMENTS

| | | | | |
|---|---|---|---|---|
| 6,980,602 B1* | 12/2005 | Kleinerman | .......... | H04L 1/0047 327/1 |
| 2007/0268981 A1* | 11/2007 | Heiskala | ................. | H04L 1/005 375/267 |

(Continued)

OTHER PUBLICATIONS

French Preliminary Search Report dated Aug. 14, 2019 in French Application 19 01358 filed on February 12, 2019 (with English Translation of Categories of Cited Documents), 2 pages.

(Continued)

*Primary Examiner* — Vineeta S Panwalkar
(74) *Attorney, Agent, or Firm* — Oblon, McClelland, Maier & Neustadt, L.L.P.

(57) ABSTRACT

A detection method for a MIMO system receiver in which a linear detection is carried out in order to provide an equalised vector. This equalised vector is represented in a reduced basis obtained from the reduction of the channel matrix. It undergoes an iterative noise cancellation process in the representation according to the reduced basis. Upon each iteration, a search is carried out for the component of the equalised vector in the reduced basis located the furthest from an area unperturbed by noise surrounding the product constellation with a tolerance margin, and the point representative of the equalised vector of this area by subtracting therefrom a noise vector in the direction of this component, the module whereof is equal to a fraction of the tolerance margin. The iterative cancellation converges when the equalised vector belongs to the area unperturbed by noise.

10 Claims, 5 Drawing Sheets

(51) Int. Cl.
H04L 27/26 (2006.01)
H04L 27/34 (2006.01)

(58) Field of Classification Search
CPC ....... H04L 27/3483; H04L 2025/03624; H04L 25/03019; H04L 25/067; H04L 25/0204; H04L 25/0224
See application file for complete search history.

(56) References Cited

U.S. PATENT DOCUMENTS

2012/0114058 A1* 5/2012 Gan .................. H04L 25/03242
375/267
2018/0287675 A1 10/2018 Sheikh et al.

OTHER PUBLICATIONS

Wuebben, D, et al., "Lattice Reduction", IEEE Signal Processing Magazine, vol. 28, No. 3, May 2011, 22 pages.
Wuebben, D, et al., "Near-Maximum-Likelihood Detection of MIMO Systems using MMSE-Based Lattice-Reduction", IEEE Communications Society, 2004, pp. 798-802.

* cited by examiner

DETECTION METHOD FOR LATTICE REDUCTION-AIDED MIMO SYSTEM RECEIVER AND ITERATIVE NOISE CANCELLATION

TECHNICAL FIELD

The present invention relates to the field of multi-antenna telecommunication systems also referred to as MIMO (Multiple Input Multiple Output) systems and more particularly those using lattice reduction-aided MIMO detection.

PRIOR ART

Multi-antenna telecommunication systems or MIMO (Multiple Input Multiple Output) systems are well known in the prior art and were first implemented, about ten years ago, in several wireless telecommunication system standards (for example IEEE 802.11n). These systems have, as a result of the multiplexing capacity thereof and the spatial diversity thereof, channel capacities that are substantially greater than the conventional single-antenna systems or SISO (Single Input Single Output) systems.

A MIMO transmission system with $N_T$ transmit antennas and $N_R$ receive antennas is characterised by the channel matrix H thereof, of size $N_R \times N_T$ the elements whereof are complex attenuation coefficients of the basic channels between the $N_T$ transmit antennas and $N_R$ receive antennas.

FIG. 1 diagrammatically shows such a MIMO system. An element $h_{ik}$ of the matrix H gives the basic channel coefficient between the transmit antenna of index k and the receive antenna of index i.

The transmission of a block of symbols in such a system can be modelled by:

$$y = Hs + n \quad (1)$$

where s is the vector of the symbols respectively transmitted by the $N_T$ transmit antennas, y is a vector of size $N_R$ representing the signals respectively received by the $N_R$ receive antennas, and n is a white noise vector of size $N_R$, the components whereof are independent centred random Gaussian variables with the same variance $\sigma_n^2$. The channel matrix H is assumed to be known by the receiver, for example by means of a channel estimation from pilot symbols.

The symbols transmitted belong to a modulation alphabet, denoted A, for example a M-QAM alphabet.

It is assumed hereinbelow that the number of receive antennas is greater than or equal to the number of transmit antennas, i.e. $N_R \geq N_T$.

Since the elements of the vectors and of the matrix involved in the relation (1) are complex values, the real and imaginary parts thereof are processed separately. In other words, if $\bar{y}$, $\bar{s}$ and $\bar{n}$ are the real vectors respectively of size $n_R$, $n_T$ and $n_R$ where $n_R = 2N_R$ and $n_T = 2N_T$ defined by:

$$\bar{y} = \begin{pmatrix} \Re(y) \\ \Im(y) \end{pmatrix}; \bar{s} = \begin{pmatrix} \Re(s) \\ \Im(s) \end{pmatrix}; \bar{n} = \begin{pmatrix} \Re(n) \\ \Im(n) \end{pmatrix} \quad (2)$$

and the channel matrix $\bar{H}$ is a real matrix of size $n_R \times n_T$ defined by:

$$\bar{H} = \begin{pmatrix} \Re(H) & -\Im(H) \\ \Im(H) & \Re(H) \end{pmatrix} \quad (3)$$

the relation (1) remains valid in a real form:

$$\bar{y} = \bar{H}\bar{s} + \bar{n} \quad (4)$$

Different detection types can be provided for during receipt.

Optimal detection uses a criterion of maximum likelihood or ML, consisting of searching all possible transmitted symbol vectors for that which minimises the Euclidean distance to the received vector, in other words:

$$\hat{s}_{ML} = \underset{s \in A^{N_T}}{\operatorname{argmin}}(\|y - Hs\|) \quad (5)$$

However, this search has a complexity in $M^{n_T}$ and thus cannot be carried out in practice for high modulation orders and a large number of transmit antennas.

In practice, sub-optimal detection methods are implemented, referred to as linear methods, allowing the different symbols to be separated by means of linear combinations. More specifically, referring back to the complex formulation of the relation (1), the vector of the transmitted symbols is estimated by multiplying the vector of the received signals by a detection matrix (also referred to as an equalisation matrix) W of size $n_T \times n_R$:

$$r = Wy = WHs + Wn \quad (6)$$

where the detection matrix can take different forms as a function of the selected detection type: ZF (Zero Forcing), MMSE (Minimum Square Error), or MRC (Maximum Ratio Combining) also referred to as MF (Matched Filter), i.e.:

$$W_{ZF} = H^\dagger = (H^H H)^{-1} H^H \quad (7\text{-}1)$$

$$W_{MMSE} = (H^H H + \sigma_n^2 I_{N_R})^{-1} H^H \quad (7\text{-}2)$$

$$W_{MF} = H^H \quad (7\text{-}3)$$

The respective advantages and drawbacks of these different detection types are known: thus, a ZF-type detection can considerably amplify the noise components and a MMSE-type detection, although reducing this amplification, requires the signal-to-noise ratio to be estimated and is thus more complex.

The transmitted symbols are then estimated by making a hard or soft decision (dec) on the components of the equalised vector, r:

$$\hat{s}_{ZF} = \text{dec}(W_{ZF} y) \quad (8\text{-}1)$$

$$\hat{s}_{MMSE} = \text{dec}(W_{MMSE} y) \quad (8\text{-}2)$$

$$\hat{s}_{MF} = \text{dec}(W_{MF} y) \quad (8\text{-}3)$$

For example, in the case of a hard decision, for each component of the equalised vector, the element of the alphabet, i.e. the point of the modulation constellation located the closest to this component, is sought.

Although a linear detector (LD) is relatively simple, the performance levels thereof depend on the conditioning of the matrix H and more specifically on the extent to which it deviates from orthogonality. More specifically, if the specific values of the matrix $H^H H$ are low, the noise components (Wn in expression (3)) are amplified and the error rate (BER) is high.

In order to overcome this difficulty, lattice reduction-aided linear detection has been proposed, as described in the article by D. Wübben entitled "Near-maximum likelihood detection of MIMO systems using MMSE-based lattice reduction" published in Proc. IEEE International Conference on Communications, vol. 2, June 2004, pp. 798-802.

It should first of all be remembered that a lattice $\Lambda$ in $\mathbb{R}^n$ is defined as being the set of linear combinations having integer coefficients of a plurality of vectors $v_1, \ldots, v_n$ forming a basis V of $\mathbb{R}^n$, in other words:

$$\Lambda = \left\{ \sum_{i=1}^{n} a_i v_i \,\middle|\, a_i \in \mathbb{Z}^n \right\} \quad (9)$$

The generator basis V of the lattice is shown by the matrix $V=(v_1|v_2|\ldots|v_n)$ in the canonical basis of $\mathbb{R}^n$, in other words the matrix V is the matrix, the column vectors whereof are the vectors of the basis V.

The same lattice $\Lambda$ can be generated by different bases. Thus, if V is a generator basis of the lattice, represented by the matrix V and if T is a unimodular matrix (in other words an integer coefficient matrix, the absolute value of the determinant whereof is equal to 1), the columns of the matrix V' defined by:

$$V'=VT \quad (10)$$

produce the same lattice $\Lambda$.

The reduction of a lattice $\Lambda$ consists of finding a generator basis of this lattice formed by vectors of a shortest length and the closest to orthogonality.

The extent to which the basis V deviates from orthogonality is given by the indicator:

$$od(V) = \frac{\prod_{i=1}^{n} \|v_i\|}{vol(\Lambda)} \quad (11)$$

where $vol(\Lambda)=|det(V)|$, referred to as the volume of the lattice, only depends on $\Lambda$ where $det(V)$ is the determinant of the matrix V. It should be noted that the orthogonality indicator is always greater than or equal to 1, whereby equality corresponds to the case of an orthogonal basis.

The reduction of the lattice can be tackled by means of the LLL (Lenstra-Lenstra-Lovász) algorithm. A basis of the LLL-reduced lattice $\tilde{V}$ of parameter $\delta$ of the lattice is obtained from a decomposition QR of the matrix V. This basis is given by the column vectors of the matrix $\tilde{V}=\tilde{Q}\tilde{R}$ satisfying:

$$|\tilde{r}_{l,k}| \leq \tfrac{1}{2}|\tilde{r}_{l,l}| \text{ pour } 1 \leq l \leq k \leq n \quad (12\text{-}1)$$

$$\delta \tilde{r}_{k-1,k-1}^2 \leq \tilde{r}_{k,k}^2 + \tilde{r}_{k-1,k}^2 \text{ pour } 1<k \leq n \quad (12\text{-}2)$$

The parameter $\delta$ gives the quality of the basis $\tilde{V}$, the approximation is increasingly precise as the value $\delta$ nears 1.

The points of a modulation constellation M-QAM can be considered, to the nearest common translation and multiplication factor, as being elements of $\mathbb{Z}^2$. Thus, the real vector $\bar{s} \in \mathbb{Z}^{n_T}$ and the real vector $\overline{Hs}$ is an element of the lattice $\Lambda_H$ produced by the column vectors of $\overline{H}$ in the space $\mathbb{R}^{n_T}$. The vector $\bar{y}$ is thus a point of $\mathbb{R}^{n_T}$ resulting from the sum of a vector of the lattice $\Lambda_H$ and of a noise vector.

The reduction of the lattice and in particular the LLL reduction thereof allows a basis of this lattice to be obtained, constituted by short vectors close to the orthogonality condition. If $\tilde{H}$ is the matrix of the channel represented in this new basis, the following is given:

$$\tilde{H}=\overline{H}T \quad (13)$$

where T is a unimodular matrix of size $n_T \times n_T$. The set of column vectors of T is referred to as a reduced basis.

The relation (4) can thus be re-written in the form:

$$\bar{y}=\overline{H}T(T^{-1}\bar{s})+\bar{n}=\tilde{H}\bar{z}+\bar{n} \quad (14)$$

where $\bar{z}=T^{-1}\bar{s}$ represents the received signal in the reduced basis and the matrix $\tilde{H}$ is better conditioned than the matrix $\overline{H}$. It is important to understand that the point $\tilde{H}\bar{z}$ is identical to the point $\overline{Hs}$ of the lattice $\Lambda_H$.

If a linear detection is carried out during receipt, the following is obtained in the real domain:

$$\bar{r}=\overline{W}\bar{y}=\overline{W}\tilde{H}\bar{z}+\overline{W}\bar{n} \quad (15)$$

with $$\bar{r} = \begin{pmatrix} \Re(r) \\ \Im(r) \end{pmatrix} \text{ and } \overline{W} = \begin{pmatrix} \Re(\tilde{W}) & -\Im(\tilde{W}) \\ \Im(\tilde{W}) & \Re(\tilde{W}) \end{pmatrix}$$

where the linear detection matrix is obtained in this case from $\tilde{H}$:

$$\tilde{W}_{ZF}=\tilde{H}^{\dagger}=(\tilde{H}^H\tilde{H})^{-1}\tilde{H}^H \quad (15\text{-}1)$$

$$\tilde{W}_{MMSE}=(\tilde{H}^H\tilde{H}+\sigma_n^2 I_{N_R})^{-1}\tilde{H}^H \quad (15\text{-}2)$$

$$\tilde{W}_{MF}=\tilde{H}^H \quad (15\text{-}3)$$

For notation simplicity purposes, the superscript lines will be left out for real matrices and vectors. Thus, the relation (15) is written in simplified form as:

$$r=\tilde{W}y=\tilde{W}\tilde{H}z+\tilde{W}n \quad (16)$$

A person skilled in the art will however understand that the vectors and matrices appearing in the equation (16) have real values and that the dimensions thereof are double those appearing in the equation (6).

A first lattice reduction-aided linear detection or LR-LD method is described in the aforementioned article. It consists of quantising each component $z_i$, i=1, ..., $n_T$ of z on the ith vector of the reduced basis. The quantisation of the component $z_i$ is carried out by searching for the point belonging to the projection of the product constellation $A^{N_T}$ on the ith vector. In other words, in each of the directions indicated by a vector of the reduced basis, the point of the projection of the constellation $A^{N_T}$ in this direction that is the closest to the component of z on this vector is sought.

A second lattice reduction-aided linear detection method, also described in the aforementioned article, referred to as LR-LD-SIC (Lattice Reduced Linear Detection with Successive Interference Cancellation) consists of carrying out a QR decomposition of the channel matrix $\tilde{H}$ (where Q, R are respectively an orthogonal matrix and an upper triangular matrix) then of detecting the components of z, beginning with the component $z_{n_t}$ without interference from the other components (as a result of the upper triangular structure of R). The columns of $\tilde{H}$ can be permuted (which is equivalent to a permutation of the transmit antennas) so that the signal-to-noise ratio of the component $z_{n_r}$ is as high as possible. In other words, for each permutation of the columns of $\tilde{H}$, a QR decomposition is carried out and the permutation resulting in the highest coefficient $r_{n_T n_T}$ is selected.

The LR-LD method has the drawback of operating a sub-optimal truncation insofar as according to the order in which the components of z are truncated, the performance levels in terms of BER can be very different for the same signal-to-noise ratio (SNR) value.

The LR-LD-SIC method has high performance levels when the linear detection is of the MMSE type, however it requires a large quantity of computations, in particular for MIMO configurations having a large number of antennas, which is hardly compatible with the computing capacity of a mobile terminal.

Moreover, neither the LR-LD method nor the LR-LD-SD method are able to provide soft outputs, such as those required for soft input channel decoding when a turbo code, a convolutional code or an LDPC code is used for transmission.

One purpose of the present invention is thus to propose a detection method for a lattice reduction-aided MIMO system receiver, which has good performance levels in terms of error rate as a function of the signal-to-noise ratio, without requiring significant computations. One subsidiary purpose of the present invention is to propose such à lattice reduction-aided MIMO detection method that is furthermore capable of providing a detection result in the form of soft values.

DESCRIPTION OF THE INVENTION

The present invention is defined by a detection method for a MIMO system receiver with $N_T$ transmit antennas and $N_R$ receive antennas, characterised by a channel matrix H, each transmit antenna transmitting a symbol belonging to a modulation constellation, the vector of the transmitted symbols belonging to a product constellation in the space $\mathbb{R}^{2N_T}$, the channel matrix H undergoing a LLL reduction in order to provide a reduced channel matrix $\tilde{H}$, such that $\tilde{H}=HT$ where T is a unimodular matrix, the vector of the signals received by the receive antennas being equalised by means of a linear detection matrix $\tilde{W}$, obtained from the reduced channel matrix $\tilde{H}$, in order to provide an equalised vector r, in a reduced basis formed by the column vectors of the matrix T, the equalised vector being represented by c=Tr in a reduced basis formed by the column vectors of the matrix T, wherein a receive area unperturbed by noise $Z_\varepsilon$ is defined, in the representation according to the reduced basis, which area surrounds the product constellation with a predetermined tolerance margin $\varepsilon$, the equalised vector then undergoing an iterative noise cancellation process wherein, upon each iteration, a search is carried out for the component ($\ell$) of the equalised vector in the reduced basis, that is located the furthest from the receive area unperturbed by noise, and a noise vector is subtracted from the equalised vector c, the module of which noise vector is a fraction of the tolerance margin and the direction is that of the component thus determined, the process being iterated until the point representative of the equalised vector is located within said receive area unperturbed by noise or until a predetermined number of iterations is reached, the result of the detection being obtained by making a hard or soft decision on the equalised vector at the end of the iterative process.

The linear detection matrix is in particular selected from the ZF, MMSE or MF detection matrices respectively defined by:

$$\tilde{W}_{ZF}=\tilde{H}^\dagger=(\tilde{H}^H\tilde{H})^{-1}\tilde{H}^H$$

$$\tilde{W}_{MMSE}=(\tilde{H}^H\tilde{H}+\sigma_n^2 I_{N_R})^{-1}\tilde{H}^H$$

$$\tilde{W}_{MF}=\tilde{H}^H$$

where $\sigma_n^2$ is the variance of the noise affecting the signal received by a receive antenna and $I_{N_R}$ is the identity matrix of size $N_R$.

The modulation constellations relative to the different transmit antennas are typically QAM constellations. The modulation constellations relative to the different antennas are advantageously selected such that they are identical.

Advantageously, in order to determine the component of the equalised vector in the reduced basis, that is located the furthest from the area unperturbed by noise, the index $\ell$ is sought such that $$\ell = \arg\max_i \ (c_i - s_{max} - \varepsilon/v_i)$$

where $c_i$ is the $i^{th}$ component of the equalised vector c, $s_{max}$ is the maximum amplitude of the QAM constellation, and $$v_i = \max_{j\neq i}(|\langle t_i \mid t_j \rangle|)$$

where $t_i$ is the $i^{th}$ column vector of T.

The noise vector subtracted from the equalised vector c can be determined by $$a_\ell \mathrm{sgn}(c_\ell) \cdot \mu \cdot \left(\frac{\varepsilon}{v_\ell}\right)$$

where $\mathbf{a}_\ell$ is the $\ell$-th column of the matrix A, where A is the Gram matrix of the reduced basis $A=TT^T$, $\mathrm{sgn}(c_\ell)$ is the sign of the $\ell$-th component of the equalised vector c and $\mu$ is the value of said fraction. In particular, $\mu=\frac{1}{2}$ could be selected.

According to a first alternative embodiment, a hard decision is made on the equalised vector at the end of the iterative process, by searching for the point of the product constellation that is located the closest to this vector.

According to a second alternative embodiment, prior to the iterative process, the variances $\sigma_{n,m}^2$ of the noise affecting each of the components of the equalised vector c are initialised by $$\sigma_{n,m}^2 = \left(\sigma_n^2 \sum_{i=1}^{N_T}|\tilde{W}_{m,i}|^2 + \sigma_a^2 \sum_{\substack{j=1\\j\neq m}}^{N_T}|\tilde{\beta}_{m,j}|^2\right) \Big/ |\tilde{\beta}_{m,m}|^2$$

where $\sigma_n^2$ is the variance of the noise affecting the signal received by a receive antenna, $\sigma_a^2$ is the average power of the modulation constellation, $\tilde{W}_{m,i}$ is the element of the matrix $\tilde{W}$ in the row m and in the column i, $\tilde{\beta}_{m,j}$ is the element of the matrix $\beta=\tilde{W}H$ in the row m and in the column j and that at each iteration, these variances are then updated by $$\sigma_{n,m}^2 = \sigma_{n,m}^2 + \mu^2\left(\frac{\varepsilon}{v_\ell}\right)^2 |\Lambda_{m,\ell}|^2$$

where $\Lambda_{m,\ell}$ is the element in the row in and in the column $\ell$ of the Gram matrix A.

In the latter case, for each symbol transmitted by a transmit antenna m, the soft values of the different bits $b_{m,q}$ can be computed, where $b_{m,q}$ is the $q^{ème}$ bit of the word having been used to generate the transmitted symbol $s_m$, the soft values being given by $$L(b_{m,q}) = \frac{1}{2\sigma_{n,m}^2}\left(\min_{u \in S_{m,q}^1}(\|c-u\|^2) - \min_{u \in S_{m,q}^0}(\|c-u\|^2)\right)$$

where $\sigma_{n,m}^2$ is the value of the variance affecting the m-th component of the equalised vector c at the end of the iterative process, $S_{m,q}^0$ is the set of points of the product constellation, assuming $b_{m,q}=0$ and $S_{m,q}^1$ is the set of points of the product constellation, assuming $b_{m,q}=1$.

BRIEF DESCRIPTION OF THE FIGURES

Other features and advantages of the invention will appear upon reading one preferred embodiment of the invention, described with reference to the accompanying figures, in which.

DETAILED DESCRIPTION OF SPECIFIC EMBODIMENTS

Figure 1:
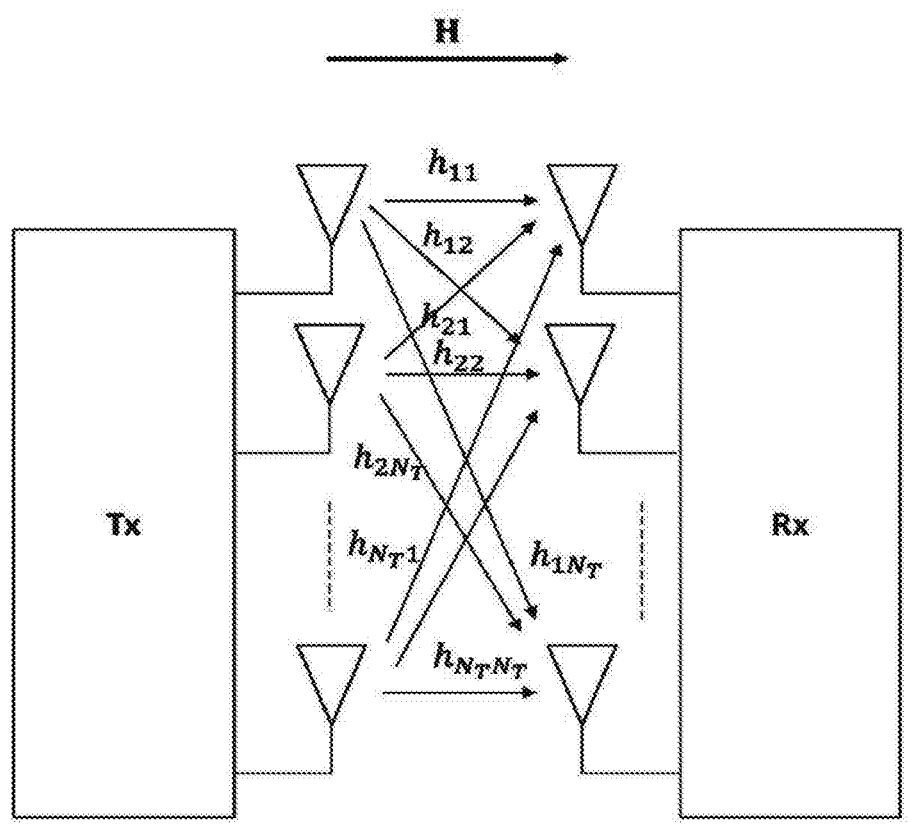
FIG. 1 diagrammatically shows a known MIMO system of the prior art.

A MIMO system will be considered in the paragraphs below as described with reference to FIG. 1. The information symbols transmitted by the $N_T$ transmit antennas belong to QAM constellations. Without loss of generality, it is assumed that the modulation alphabet (or constellation) used for the different transmit antennas is identical, in other words a block of transmitted symbols belongs to a product constellation $A^{N_T}$. It is also assumed that the transmit power of each antenna is normalised to 1. In the absence of noise, the received signal can be represented by a point of the lattice $\Lambda_H$ produced by the column vectors of H in the space $\mathbb{R}^{n_T}$ where $n_T=2N_T$. In the presence of noise, the received signal can be considered to be a point of $\mathbb{R}^{n_T}$ obtained by means of a translation by a noise vector of a point of the lattice $\Lambda_H$.

It is furthermore assumed, as stated hereinabove, that the elements of the matrix H are known by the receiver, for example by means of a channel estimation carried out from pilot symbols.

The idea on which the invention is founded is to carry out noise cancellation by iterative reduction of the noise on the different components of the equalised signal, in the reduced basis of the lattice.

Figure 2:
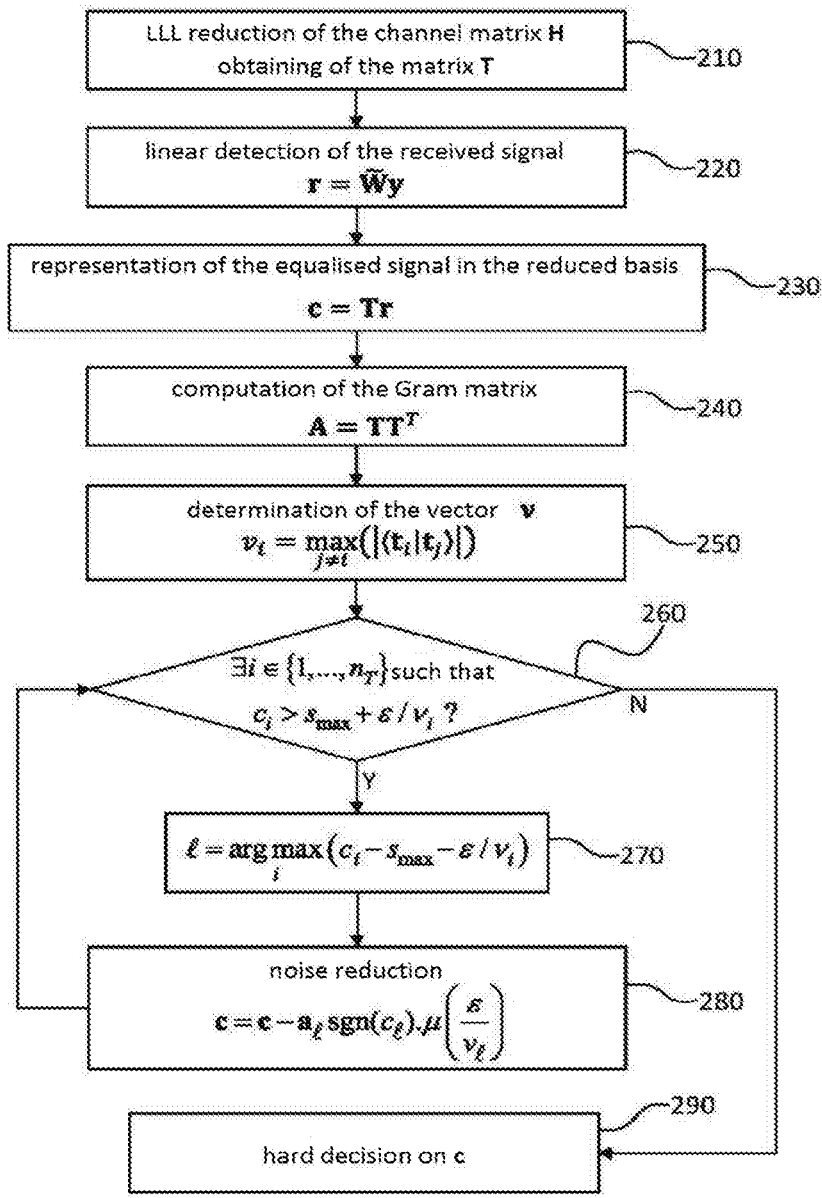
FIG. 2 diagrammatically shows a flow chart of a lattice reduction-aided linear detection and successive noise reduction method according to a first embodiment of the invention.

FIG. 2 diagrammatically shows a flow chart of a lattice reduction-aided linear detection and successive noise reduction method according to a first embodiment of the invention.

In step 210, a LLL reduction of the lattice $\Lambda_H$ produced by the column vectors of the channel matrix is carried out, expressed in real form, i.e. of size $n_R \times n_T$. This LLL reduction is known per se, it uses a QR decomposition of the channel matrix (H=QR where Q is an orthogonal matrix and R is an upper triangular matrix) and provides in return matrices $\tilde{Q}$, $\tilde{R}$ and T with $\tilde{H}=\tilde{Q}\tilde{R}$ where $\tilde{H}$ is the LLL basis ($\delta$-) reduced by $\Lambda_H$ (or channel matrix in the reduced basis), $\tilde{Q}$ is an orthogonal matrix and $\tilde{R}$ is an upper triangular matrix and T is a unimodular transformation matrix of size $n_T \times n_T$ such that $\tilde{H}=HT$, the column vectors of T forming the reduced basis.

In step 220, linear detection of the received signal is carried out by means of an equalisation matrix $\tilde{W}$.

This linear detection can, for example, be a detection of the ZF type ($\tilde{W}=\tilde{W}_{ZF}$), of the MMSE type ($\tilde{W}=\tilde{W}_{MMSE}$) or of the MF type ($\tilde{W}=\tilde{W}_{MF}$), in a manner known per se. The vector received by the receive antennas is denoted as y and the equalised vector is denoted as $r=\tilde{W}y$. The latter can be considered to be a real vector with $n_T=2N_T$ elements.

In step 230, a representation of the equalised signal in the reduced basis is obtained by computing the vector $c=Tr$ of size $n_T$.

In step 240, the Gram matrix $A=TT^T$ of the reduced basis is computed and if the Gram matrix is non-diagonal, the method skips to step 250. The Gram matrix gives the scalar products of the column vectors of T.

It should be noted that if the matrix A is diagonal, the column vectors of T are orthogonal to one another. In such a case, the detection is completed in step 290.

In step 250, for each vector of the reduced basis, i.e. each column vector $t_i$ $i=1, \ldots, n_T$, of the matrix T, the column vector $t_k$ is determined such that:

$$k = \underset{j \neq i}{\mathrm{argmax}}(|\langle t_i | t_j \rangle|) \quad (17)$$

where $\langle t_i | t_j \rangle$ represents the scalar product of the vectors $t_i$ and $t_j$ of the reduced basis. In other words, for each vector of the reduced basis, the column vector that least satisfies the orthogonality condition is determined. A vector v of size $n_T$ is thus constructed, the elements whereof are $$v_i = \underset{j \neq i}{\max}(|\langle t_i | t_j \rangle|).$$

A simple way of constructing this vector is to search each row of A for the non-diagonal element having the highest absolute value.

An iterative noise-reduction loop is then begun in step 260.

In step 260, it is determined whether the following condition is satisfied:

$$\exists i \in \{1, \ldots, n_T\} \text{ such that } c_i > s_{max} + \varepsilon/v_i \quad (18)$$

where $s_{max}$ is the maximum amplitude of a point of the constellation and $\varepsilon$ is a positive value representative of a predetermined error margin. The choice of the value of the error margin is the result of a compromise between the convergence speed and the error tolerance on the result of the detection; the lower this margin, the slower the convergence and the less erroneous the result.

If the condition (18) is not satisfied, in other words if all of the components of the equalised vector satisfy $c_i \leq s_{max} + \varepsilon/v_i$, the detection ends in step 290.

Failing this, in step 270 the component φ of the equalised vector that deviates the furthest from the product constellation is determined, more specifically that which deviates the furthest from a secure area (also referred to as a receive area unperturbed by noise) $Z_\varepsilon$ in the space $\mathbb{R}^{n_T}$ surrounding the product constellation with a noise margin of width ε:

$$\ell = \underset{i}{\mathrm{argmax}}(c_i - s_{max} - \varepsilon/v_i) \quad (19)$$

In other words, the maximum error direction is sought relative to the product constellation. It must be noted that this search is carried out in the reduced basis, in other words in a non-orthogonal basis.

Noise reduction is then carried out in step 280 by subtracting a fraction μ of the error margin in the direction of the component determined in the previous step from the equalised vector:

$$c = c - a_\ell \mathrm{sgn}(c_\ell) \cdot \mu\left(\frac{\varepsilon}{v_\ell}\right) \quad (20)$$

where a $\ell$ is the column vector of index $\ell$ of the Gram matrix A. μ=½ is chosen for example.

In other words, the equalised vector is brought closer to the area unperturbed by noise $Z_\varepsilon$ by reducing the distance to this area in the maximum error direction. A fraction of ½ is preferably used, however it is evident that other fractions can be used.

It should be noted that not only the component $c_\ell$ of the equalised vector updated by means of the relation (20), is modified since A is not a diagonal matrix.

Thus, the detection algorithm can pass several times in the same direction, by correcting an error introduced in another direction.

The algorithm continues by returning to the test step 260.

The iterations end when the equalised vector is located in the receive area unperturbed by noise $Z_\varepsilon$ (in which case the noise will have been cancelled) or, failing this, when a maximum number of iterations is reached (without convergence). In the case of convergence, the equalised vector is, at worst, located at a distance $(1-\mu)\varepsilon$ from the constellation and in the case where μ=½, in the middle of the error margin.

In step 290, quantisation of the equalised vector having undergone iterative noise reduction is carried out. This quantisation is carried out in the same manner as in the prior art, by searching for the point of the constellation located the closest to the point representing the equalised vector.

Figure 3:
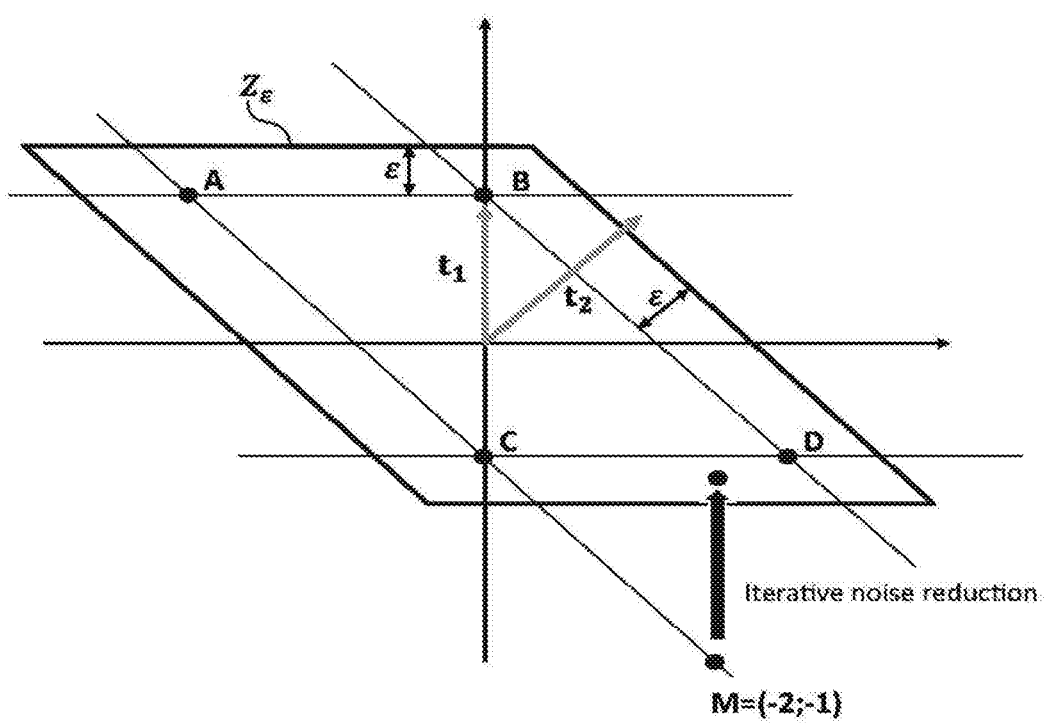
FIG. 3 diagrammatically shows one example of noise reduction in a step of the method in FIG. 2.

FIG. 3 shows on example of the noise-reduction step 280. In this example, it is assumed that only one transmit antenna ($n_T=2$) is used and that the modulation constellation used was a 4-QAM constellation. The product constellation is thus reduced to this 4-QAM constellation.

The product constellation has been shown in the reduced basis, in other words the figure shows the image of the modulation alphabet A by the transformation $T^{-1}$.

The reduced basis is formed by vectors $$t_1 = \begin{pmatrix} 0 \\ 1 \end{pmatrix} \text{ and } t_2 = \begin{pmatrix} 1 \\ 1 \end{pmatrix}$$

and thus the transformation matrix is $$T = \begin{pmatrix} 0 & 1 \\ 1 & 1 \end{pmatrix}.$$

The Gram matrix is thus $$A = \begin{pmatrix} 1 & 1 \\ 1 & 2 \end{pmatrix}.$$

The modulation symbols unperturbed by noise, i.e. the points of the modulation constellation are shown in A, B, C and D. The received signal, after equalisation, i.e. the vector r, is shown by the point M. The vector c is assumed in this case to be $$\begin{pmatrix} -2 \\ -1 \end{pmatrix}.$$

The receive area unperturbed by noise, in other words the area $Z_\varepsilon$ surrounds the modulation constellation with an error margin ε.

Depending on the direction of the vector $t_2$, the point M belongs to the area $Z_\varepsilon$ and thus noise is not reduced in this direction.

However, depending on the direction of the vector $t_1$, the point M does not belong to the area $Z_\varepsilon$ and thus is brought towards this area in this direction by means of the expression (16), where μ=½.

$$c = c - a_1(-1) \cdot \frac{1}{2}\left(\frac{\varepsilon}{1}\right) = c + \frac{\varepsilon}{2}a_1 = \begin{pmatrix} -2 + \frac{\varepsilon}{2} \\ -1 + \frac{\varepsilon}{2} \end{pmatrix} \quad (21)$$

The new equalised vector can thus be seen to be closer to the area $Z_\varepsilon$ by $$\frac{\varepsilon}{2}$$

in the direction $t_1$, however that the component thereof in the direction $t_2$ has been modified. This explains that, in some cases, the area $Z_\varepsilon$ can be left in the direction $t_2$ and that an iteration in the direction $t_2$ must be repeated.

In a second embodiment of the invention, a soft detection of the transmitted symbols is carried out. This will be, for example, the case when the successive transmitted symbols are the result of a coding of a bit sequence, for example turbo coding of a bit packet. In such a case, the convolutional decoder (for example using a SOVA algorithm or a conventional Viterbi algorithm) requires the receipt, on the input side, of the soft values of the bits of the sequence taking into account the received symbols.

The case of a SISO system is firstly described, i.e. that of a single transmit antenna and of a single receive antenna.

If $b_{m,q}$ is denoted as the $q^{th}$ bit of the word used to generate the transmitted symbol $s_m$ belonging to the modulation alphabet A, the receiver must assess the soft value or LLR (Log Likelihood Ratio), $L(b_{m,q})$ defined by:

$$L(b_{m,q}) = \ln \frac{P(b_{m,q} = 1 \mid y)}{P(b_{m,q} = 0 \mid y)} = \ln \frac{P(y \mid b_{m,q} = 1)}{P(y \mid b_{m,q} = 0)} \quad (22)$$

where it is reminded that the vector y represents the received signal (and where it is assumed that the prior probabilities of the two binary values were identical).

The conditional probabilities $P(y|b_{m,q}=X)$ (where X=0 or 1) are determined from:

$$P(y \mid b_{m,q} = X) = \sum_{u \in S_{m,q}^X} P(y \mid s = u) \quad (23)$$

where P(y|s=u) is the conditional probability of receiving the vector y given that the transmitted symbol is $u \in S_{m,q}^X$, $S_{m,q}^X$ representing the set of symbols of the alphabet A assuming $b_{m,q}=X$.

In a conventional manner, the sum of the terms appearing on the right of the relation (23) can be approximated by the determinant term (referred to as the Max-Log approximation):

$$P(y \mid b_{m,q} = X) \approx \max_{u \in S_{m,q}^X} (P(y \mid s = u)) \quad (24)$$

Given the Gaussian density of the conditional probability, the soft value of the bit $b_{m,q}$ is expressed in the following form:

$$L(b_{m,q}) = \frac{1}{2\sigma_n^2} \left( \min_{u \in S_{m,q}^1} \left( \|y - Hu\|^2 - \min_{u \in S_{m,q}^0} (\|y - Hu\|^2) \right) \right) \quad (25)$$

where H is the matrix of the channel (in this case reduced to a single element since the system is SISO).

The relation (25) easily extends to a MIMO system using a linear detection:

$$L(b_{m,q}) = \frac{1}{2\sigma_{n,m}^2} \left( \min_{u \in S_{m,q}^1} \left( \|r - u\|^2 - \min_{u \in S_{m,q}^0} (\|r - u\|^2) \right) \right) \quad (26)$$

the vector u thus representing the vector of the transmitted symbols (and thus an element of the product constellation), H being the complex matrix of the channel of size $N_T \times N_T$, r=Wy being the equalised vector where y represents the vector of size $N_R$ of the signals received by the different receive antennas, and where $\sigma_{n,m}^2$ represents the noise variance affecting the component $r_m$ of the equalised vector. As a result of this equalisation, the noise variance is not identical for the different components:

$$\sigma_{n,m}^2 = \left( \sigma_n^2 \sum_{i=1}^{N_T} \left| \tilde{W}_{m,i} \right|^2 + \sigma_a^2 \sum_{j=1, j \neq m}^{N_T} \left| \tilde{\beta}_{m,j} \right|^2 \right) / \left| \tilde{\beta}_{m,m} \right|^2 \quad (27)$$

where $\tilde{W}_{m,i}$ is the element of the matrix $\tilde{W}$ in the row m and in the column i, in other words corresponding to the receive antenna m and to the transmit antenna i, $\tilde{\beta}_{m,j}$ is the element of the matrix $\beta = \tilde{W}H$ in the row m and in the column j, $\sigma_a^2$ is the average power of the modulation constellation (assumed to be identical for all transmit antennas) and $\sigma_n^2$ is the noise variance affecting the signal received by a receive antenna (the variance is assumed to be identical for all receive antennas).

Figure 4:
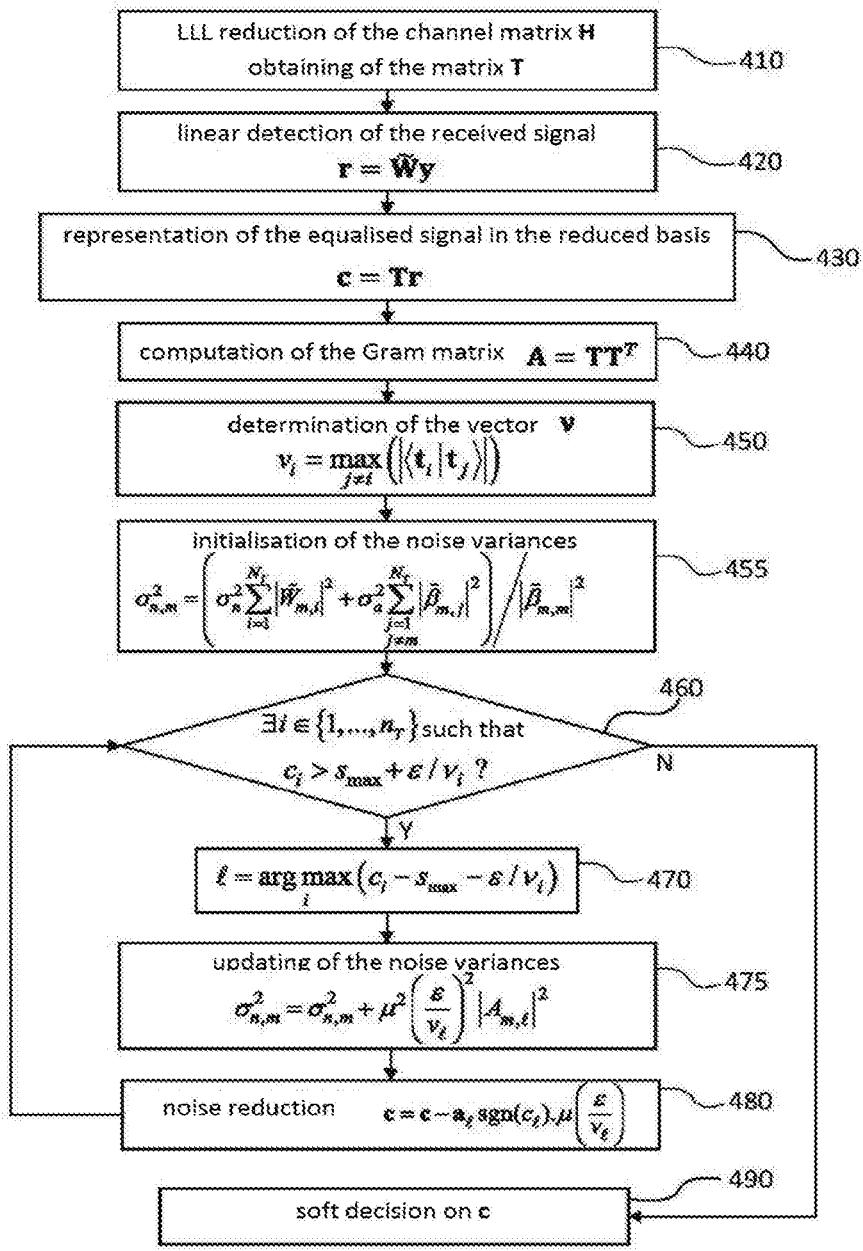
FIG. 4 diagrammatically shows a flow chart of a lattice reduction-aided linear detection and successive noise reduction method according to a second embodiment of the invention.

The computation of the soft values according to (26) and (27) must be adapted to the case whereby an iterative noise reduction is carried out in addition to equalisation, as shown with reference to FIG. 4.

FIG. 4 diagrammatically shows a flow chart of a lattice reduction-aided linear detection and successive noise reduction method according to a second embodiment of the invention.

Steps 410 to 480 are identical to steps 210 to 280 described hereinabove with reference to FIG. 2 and the description thereof will not be repeated here.

However, an initialisation step has been added in step 455, in addition to a step of updating the noise power in step 475.

More specifically, step 455 comprises the initialisation of the noise variances (or noise powers) affecting the different components of the equalised vector by the relation (27).

Then, upon each iteration, the noise variances $\sigma_{n,m}^2$, are updated in step 475 by:

$$\sigma_{n,m}^2 = \sigma_{n,m}^2 + \mu^2 \left( \frac{\varepsilon}{v_\ell} \right)^2 \left| A_{m,\ell} \right|^2 \quad (28)$$

where $A_{m,\ell}$ is the element in the row m and in the column $\ell$ of the Gram matrix A. It is understood from the expression (28) that only the variances relative to the components affected by the noise reduction are updated.

Finally, in step 490, instead of making a hard decision such as that in step 290, the distances of the equalised vector c to the different points of the product constellation are computed, then the soft values of the different bits are computed by:

$$L(b_{m,q}) = \frac{1}{2\sigma_{n,m}^2} \left( \min_{u \in S_{m,q}^1} \left( \|c - u\|^2 - \min_{u \in S_{m,q}^0} (\|c - u\|^2) \right) \right) \quad (29)$$

the noise variances $\sigma_{n,m}^2$ affecting the different components of the equalised vector having been updated during successive iterations according to (28).

If a turbo coding was carried out upon transmission in order to generate symbols on each of the antennas, decoding of the BCJR type can be carried out using, as an input, the soft values provided by step 490.

Figure 5:
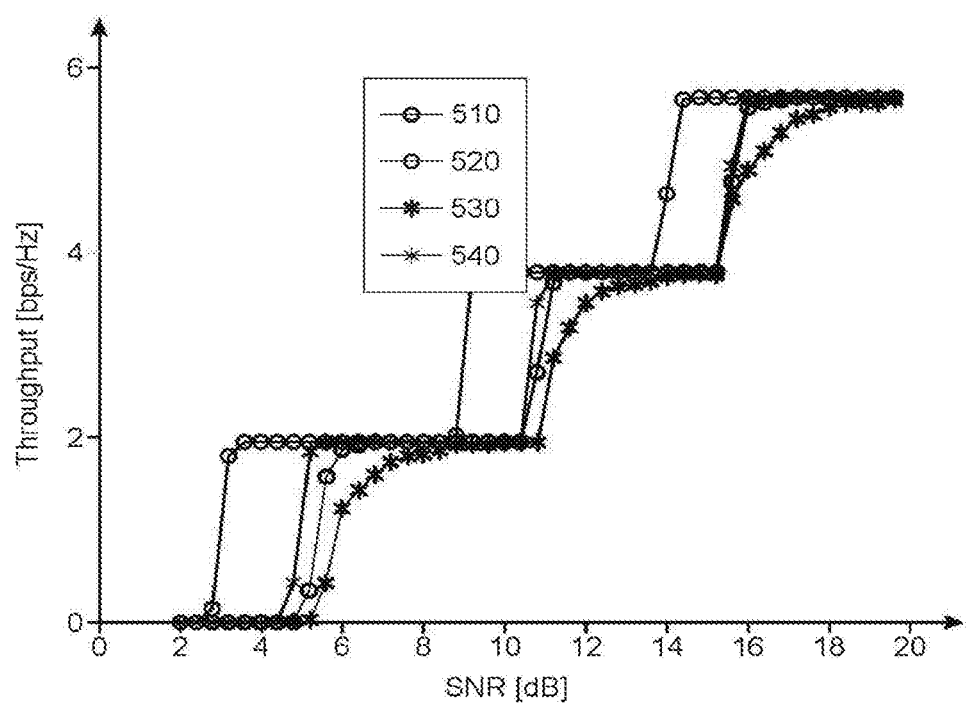
FIG. 5 shows the throughput of the MIMO system as a function of the signal-to-noise ratio for a detection method according to the second embodiment of the invention and for a detection method according to the prior art.

FIG. 5 shows the throughput of the MIMO system as a function of the signal-to-noise ratio for a detection method according to the second embodiment of the invention and for a detection method according to the prior art.

The MIMO system used was a 2×2 system with 16-QAM modulation. Turbo coding of rate R=1/2 for 6144-bit packets was carried out upon transmission before 16-QAM modulation for each antenna.

The throughput of the system is given by $\rho(1-\eta)^Q$ where $\rho$ is the transmission speed in bit/s, Q is the size of the packet and $\eta$ is the bit error rate.

The curve 510 represents the throughput of the system when, upon receipt, a linear detection of the ZF type and a computation of soft values according to (22) and (23), i.e. without the Max-Log approximation, are carried out before carrying out BCJR decoding.

The curve 520 represents the throughput of the system when, upon receipt, a linear detection of the ZF type, iterative noise cancellation according to the second embodiment of the invention, and computation of the soft values according to (22) and (23) are carried out before carrying out BCJR decoding.

The curve 530 represents the throughput of the system under the same conditions as 510, however using the Max-Log approximation, in other words using the soft value expressions according to (26) and (27).

The curve 540 represents the throughput of the system according to the second embodiment of the invention, however using the Max-Log approximation, in other words using the soft value expressions according to (26) and (27) and the iterative updating of the variances according to (28), before carrying out channel decoding.

A significant improvement to the throughput is noted in the case wherein the second embodiment of the invention is used, see curves (520) and (540), instead of a detection method of the prior art, see curves (510) and (530).

The invention claimed is:

1. A detection method for a Multiple Input Multiple Output (MIMO) system receiver with $N_T$ transmit antennas and $N_R$ receive antennas and a channel matrix H, each transmit antenna transmitting a symbol belonging to a modulation constellation, a vector of the transmitted symbols belonging to a product constellation in the space $\mathbb{R}^{2N_T}$, the method comprising:

performing, on the channel matrix H, a Lenstra-Lenstra-Lovasz (LLL) reduction in order to provide a reduced channel matrix $\tilde{H}$, such that $\tilde{H}=HT$ where T is a unimodular matrix, equalizing a vector of signals received by the receive antennas by means of a linear detection matrix $\tilde{W}$, obtained from the reduced channel matrix $\tilde{H}$, in order to provide an equalized vector r in a reduced basis formed by column vectors of the matrix T, the reduced-basis equalized vector being represented by c=Tr in the reduced basis formed by the column vectors of the matrix T, defining a receive area unperturbed by noise $Z_\varepsilon$ in a representation according to the reduced basis, the receive area surrounding the product constellation with a predetermined tolerance margin $\varepsilon$, performing, on the equalized vector, an iterative noise cancellation process wherein, upon each iteration, a search is carried out for a component ($\ell$) of the equalized vector in the reduced basis that is located furthest from the receive area unperturbed by noise, and a noise vector is subtracted from the equalized vector c, wherein a module of the noise vector is a fraction of a tolerance margin, and a direction is that of the component ($\ell$), the noise cancellation process being iterated until a point representative of the equalized vector is located within said receive area unperturbed by noise or until a predetermined number of iterations is reached, and making a hard or soft decision on the equalized vector after an end of the iterative noise cancellation process to obtain a result of the detection method.

2. The detection method according to claim 1, wherein the linear detection matrix is selected from the Zero Forcing (ZF), Minimum Square Error (MMSE), or Matched Filter (MF) detection matrices respectively defined by:

$$\tilde{W}_{ZF}=\tilde{H}^\dagger=(\tilde{H}^H\tilde{H})^{-1}\tilde{H}^H$$

$$\tilde{W}_{MMSE}=(\tilde{H}^H\tilde{H}+\sigma_n^2 I_{N_R})^{-1}\tilde{H}^H$$

$$\tilde{W}_{MF}=\tilde{H}^H$$

where $\sigma_n^2$ is a variance of the noise affecting the signal received by a receive antenna and $I_{N_R}$ is an identity matrix of size $N_R$.

3. The detection method according to claim 1, wherein modulation constellations relative to the different transmit antennas are quadrature amplitude modulation (QAM) constellations.

4. The detection method according to claim 3, wherein the modulation constellations relative to the different antennas are identical.

5. The detection method according to claim 4, wherein in order to determine the component $\ell$ of the equalized vector in the reduced basis that is located furthest from the receive area unperturbed by noise, the method further comprises searching for the component such that $$\ell = \arg\max_i (c_i - s_{max} - \varepsilon/v_i)$$

where $c_i$ is an $i^{th}$ component of the equalized vector c, $s_{max}$ is a maximum amplitude of the QAM constellation, and $$v_i = \max_{j \neq i}(|\langle t_i | t_j \rangle|)$$

where $t_i$ is an $i^{th}$ column vector of T.

6. The detection method according to claim 5, further comprising determining the noise vector that is subtracted from the equalized vector c by calculating $$a_\ell \, \text{sgn}(c_\ell).\mu.\left(\frac{\varepsilon}{v_\ell}\right)$$

where $a_\ell$ is an $\ell$-th column of a matrix A, where the matrix A is a Gram matrix of the reduced basis $A=TT^T$, $\text{sgn}(c_\ell)$ is a sign of the $\ell$-th component of the equalized vector c, and $\mu$ is a value of the fraction.

7. The detection method according to claim 6, wherein $\mu=\frac{1}{2}$.

8. The detection method according to claim 1, wherein the step of making the hard or soft decision comprises making the hard decision on the equalized vector at the end of the iterative process by searching for a point of the product constellation that is located closest to the equalized vector.

9. The detection method according to claim 6, wherein the method further comprises, prior to the iterative noise cancellation process, initializing variances $\sigma_{n,m}^2$ of the noise affecting each of components of the equalized vector c by $$\sigma_{n,m}^2 = \left( \sigma_n^2 \sum_{i=1}^{N_T} |\tilde{W}_{m,i}|^2 + \sigma_a^2 \sum_{\substack{j=1 \\ j \neq m}}^{N_T} |\tilde{\beta}_{m,j}|^2 \right) / |\tilde{\beta}_{m,m}|^2$$

where $\sigma_n^2$ is a variance of noise affecting the signal received by a receive antenna, $\sigma_a^2$ is an average power of the modulation constellation, $\tilde{W}_{m,i}$ is an element of a matrix $\tilde{W}$ in a row m and in a column i, $\tilde{\beta}_{m,j}$ is an element of a matrix $\beta = \tilde{W}H$ in the row m and in a column j and that at each iteration, the variances are updated by $$\sigma_{n,m}^2 = \sigma_{n,m}^2 + \mu^2 \left(\frac{\varepsilon}{v_\ell}\right)^2 |A_{m,\ell}|^2$$

where $A_{m,\ell}$ is an element in the row m and in a column $\ell$ of the Gram matrix A.

10. The detection method according to claim 9, further comprising computing, for each symbol transmitted by a transmit antenna m, soft values of different bits $b_{m,q}$, where $b_{m,q}$ is a $q^{th}$ bit of a word having been used to generate the transmitted symbol $s_m$, the soft values being given by $$L(b_{m,q}) = \frac{1}{2\sigma_{n,m}^2} \left( \min_{u \in S_{m,q}^1} \left( \|c - u\|^2 - \min_{u \in S_{m,q}^0} (\|c - u\|^2) \right) \right)$$

where $\sigma_{n,m}^2$ is a value of a variance affecting an m-th component of the equalized vector c at the end of the iterative process, $S_{m,q}^0$ is a set of points of the product constellation, assuming $b_{m,q}=0$ and $S_{m,q}^1$ is a set of points of the product constellation, assuming $b_{m,q}=1$.

\* \* \* \* \*